United States Patent [19]

Klein

[11] 4,455,245

[45] Jun. 19, 1984

[54] FLOCCULATING REAGENT

[76] Inventor: Pearl M. Klein, c/o Rosario Dominicana, S.A., P.O. Box 944, Santo Domingo, Dominican Republic

[21] Appl. No.: 516,336

[22] Filed: Jul. 22, 1983

Related U.S. Application Data

[62] Division of Ser. No. 350,372, Feb. 19, 1982, Pat. No. 4,415,458.

[51] Int. Cl.$^3$ .............................................. C09K 3/00
[52] U.S. Cl. ..................................... 252/60; 252/180
[58] Field of Search .................................. 252/60, 180

[56] References Cited

U.S. PATENT DOCUMENTS

| | | | |
|---|---|---|---|
| 3,292,780 | 12/1968 | Frommer et al. | 209/5 |
| 3,862,027 | 1/1975 | Mercade | 209/5 |
| 3,956,119 | 5/1976 | Davidtz | 210/47 |
| 4,017,392 | 4/1977 | Hamer et al. | 210/54 |
| 4,081,357 | 3/1978 | Werneke et al. | 209/5 |
| 4,090,955 | 5/1978 | Dexter et al. | 209/5 |
| 4,137,164 | 1/1979 | Coscia et al. | 210/54 |
| 4,192,737 | 3/1980 | Thompson et al. | 209/5 |
| 4,209,397 | 6/1980 | Green et al. | 210/54 |
| 4,210,531 | 7/1980 | Wang et al. | 209/5 X |
| 4,217,215 | 8/1980 | Panzer et al. | 210/54 |
| 4,235,709 | 11/1980 | Baudet et al. | 209/5 |
| 4,268,379 | 5/1981 | Poulos et al. | 209/5 |

OTHER PUBLICATIONS

Gary et al., United States Department of the Interior–Bureau of Mines Report 6163, "Chemical and Physical Beneficiation of Florida Phosphate Slimes", (1963).

*Primary Examiner*—John E. Kittle
*Assistant Examiner*—Robert A. Wax
*Attorney, Agent, or Firm*—Fulwider, Patton, Rieber, Lee & Utecht

[57] ABSTRACT

Cost effective and environmentally acceptable reagents and a method for flocculating fine particles from liquid suspensions are provided. A method for selectively flocculating fine particles from a slurry is also provided. The reagents comprise orange peel extract, corn husk extract and mixtures thereof. The method generally comprises the step of adding a reagent to a suspension of fine particles, mixing the combination of reagent and suspension and allowing the flocculated fine particles to settle out of suspension.

10 Claims, No Drawings

FLOCCULATING REAGENT

This is a division, of application Ser. No. 350,372, filed Feb. 19, 1982, now U.S. Pat. No. 4,415,458.

BACKGROUND OF THE INVENTION

This invention relates generally to the precipitation of flocculation of finely divided particles from a liquid, and more particularly, to new reagents useful in the flocculation of fine particles suspended in water.

The mining industry generates substantial quantities of process water containing high concentrations of suspended fine particulate matter. Depending upon the particular application, a company may desire to reclaim this water for further use or to dispose of this water by releasing it into the environment. In either case, the particulate matter may be separated before the process water may be released into the environment or is reclaimed for further use. Many methods of separation have been attempted, but they have not proven to be entirely satisfactory.

One method of separation requires the transfer of the process water to a settling pond where the fine particles therein are allowed to settle through the force of gravity. The rate of settling is very slow, however, making this method commerically unacceptable.

Other methods for separation have been attempted including conventional filtration, pressure filtration, hydrocycloning, centrifugation, and electrical methods such as electrophoretic and electroosmotic methods. These methods, however, have not proven to be satisfactory.

Other methods employ flocculating reagents to separate fine particles. Such reagents, however, are relatively expensive, may produce a relatively slow rate of separation, and may not be environmentally acceptable.

It will be appreciated from the foregoing that there is a definite need for an effective and economical method to effect the rapid separation of fine particles suspended in process water from mining operations.

SUMMARY OF THE INVENTION

The invention provides for new and unique flocculating reagents that significantly increase the rate of settling of fine particles from an aqueous suspension. Moreover, the flocculating reagents of the present invention are environmentally safe, inexpensive, and easy to produce and use.

It has been discovered that an extract derived from orange peels acts as an excellent flocculating reagent. It has further been discovered that an extract derived from corn husks which include corn leaves and the silk-like fibers that surround an ear of corn also serves as an extremely effective flocculating reagent.

The flocculating reagents derived from orange peels and corn husks are produced according to the same process. First, orange peels or corn husks, are admixed with a solvent. This admixture is then heated for a period long enough to allow the active ingredients from the orange peels or corn husks to go into solution. Heating the admixture as aforesaid may be under atmospheric conditions or under pressure as in an autoclave.

To flocculate fine particles from a suspension of process water, an effective amount of the flocculating reagents disclosed hereunder are mixed into the suspension. The optimum amount of reagent to be added will vary according to the type and concentration of particles, and can be determined by routine testing. Each of these reagents may be used separately, or in combination as a mixture, or in succession depending upon the type of fine particles which are in suspension.

Other features and advantages of the present invention will become apparent as the description of this invention proceeds.

DESCRIPTION OF THE PREFERRED EMBODIMENT

In producing the orange peel or the corn husk flocculating reagents of the present invention, a quantity or orange peels or corn husks are mixed with a solvent. This mixture is then heated until the active ingredients of the orange peels or corn husks are extracted into the solvent. This combination of solvent plus the extracted active ingredients is hereinafter referred to as the orange peel or corn husk extract. For ease of handling and to gain higher yields, the orange peels or corn husks may be separated from the extract and pressed. Any fluid which is squeezed from the peels or husks may be added to the extract. The pressed and separated peels or husks may be mixed with fresh solvent, heated, separated and pressed a second or even a third time to obtain additional batches of extract.

The extracts of the present invention may be used to flocculate many types of fine particles including, but not limited to, colloidal clay, barite, phosphate, calcium phosphate, bentonite, calcium carbonate, talc, limestone, dolomite, kaolin, and antimony oxide.

The extracts of the present invention may also be used as selective flocculating reagents to separate various naturally occurring minerals found in ores. Such ores are first crushed into fine particles and slurried with water. The slurry is then mixed with the extract of the present invention to selectively flocculate desired minerals from those that are unwanted. By way of example and not by way of limitation, the extracts of the present invention may be used to selectively flocculate hematitic iron from a hematitic iron ore.

The extracts of the present invention may be used as a flocculating reagent without limitation as to the pH of the process water. These reagents are effective over a broad range of particle size, from about 2 microns to about 74 microns. Finally, the reagents are effective in flocculating many types of particles without the aid of a dispersing agent, i.e., an agent which liberates the bonds between particles to promote flocculation, although in some cases a dispersing agent is preferred.

The following examples will serve to illustrate the invention.

EXAMPLE 1

An extract from orange peels was produced by the following method.

Two hundred grams of fresh orange peels were cut to approximately $\frac{1}{4}''$ size, mixed with 2 liters of distilled water, transferred to a pressure autoclave, and boiled gently at a temperature of 85° C. and a pressure of 0.5 pounds per square inch gauge (psig) for 30 minutes. After boiling, the orange peels were separated by conventional filtration from the orange peel extract. The orange peels were then pressed and any fluid resulting therefrom was added to the orange peel extract.

Although not necessary to the present invention, the following steps were performed in order to arrive at a particular concentration of extract. Additional distilled water was added to the orange peel extract until a total of 2 liters was reached. This 2 liter volume was boiled at a temperature of 95° C. and a pressure of 0.5 psig for approximately two hours and until the volume was reduced to 100 millimeters.

The orange peel extract was thereafter diluted with distilled water and thoroughly mixed to make a solution that was 0.1% extract and 99.9% distilled water by volume.

EXAMPLE 2

A corn husk extract was produced by the following method.

Two hundred grams of fresh corn husks were cut into ½ inch size squares, mixed with 2 liters of distilled water, transferred to a pressure autoclave and boiled gently at a temperature of 85° C. and a pressure of 0.5 pounds per square inch gauge (psig) for thirty minutes. After boiling, the corn husks were separated by conventional filtration from the corn husk extract. The corn husks were then pressed and any fluid resulting therefrom was added to the corn husk extract.

Although not necessary to the present invention, the following steps were performed in order to arrive at a particular concentration of extract. Additional distilled water was added to the corn husk extract until a total of 2 liters was reached. This 2 liter volume was boiled at a temperature of 95° C. and a pressure of 0.5 psig for approximately two hours and until the volume was reduced to 100 millimeters.

The corn husk extract was thereafter diluted with distilled water and thoroughly mixed to make a solution that was 0.1% extract and 99.9% distilled water by volume.

EXAMPLE 3

Control Without the Reagents of the Present Invention

Suspensions containing colloidal clay and water were studied to determine the settling rate of the clay particles from the suspension without the use of any flocculating reagent. In each suspension studied, the size of the clay particles varied; 95% of the particles were less than 5 microns and 50% of the particles were less than 3 microns in size. Each suspension studied also contained a different concentration of clay particles; the first contained a concentration of 3% clay by weight; the second, a concentration of 7.5% clay by weight; the third, a concentration of 15% clay by weight; the fourth, a concentration of 25% clay by weight; and the fifth, a concentration of 30% clay by weight of the total clay-water suspension.

For each suspension studied, 100 milliliters of the clay-water suspension were poured into a conventional 100 milliliter graduated cylinder, and the clay particles were allowed to settle for a period of 1200 minutes. During this 1200 minute period, a clear supernatant layer developed and grew above a lower, more turbid layer. After the 1200 minutes expired, the depth of the supernatant layer was determined by measuring the distance between the top surface of the supernatant layer and the interface between the supernatant layer and the turbid layer. In addition, the average rate of growth of the supernatant layer was determined over the 1200 minute period and is referred to in Table 1 as "settling rate." The results of this study are reported in Table 1.

TABLE 1

| Clay particle Concentration, Weight percent | Depth of Supernatant, Millimeters | Settling Time, Minutes | Settling Rate, Millimeters Per Minute |
| --- | --- | --- | --- |
| 3.0 | 1.5 | 1200 | 0.00125 |
| 7.5 | 1.8 | 1200 | 0.00150 |
| 15.0 | 2.0 | 1200 | 0.00167 |
| 25.0 | 2.5 | 1200 | 0.00209 |
| 30.0 | 3.3 | 1200 | 0.00275 |

EXAMPLE 4

The process of Example 3 was repeated except that the clay-water suspensions were admixed with a quantity of orange peel extract.

Various amounts of a 0.1% by volume orange peel extract, produced according to the method of Example 1, were mixed with 100 milliliters of the same clay-water suspensions of Example 3 in 100 ml. graduated cylinders. The graduated cylinders were corked with an ordinary rubber stopper and their contents thoroughly mixed by agitation. The fine particles were allowed to settle from suspension for a period of five minutes and the depth of the supernatant layer was then measured in the same manner as in Example 3. Table 2 contains the results.

Table 2, and the tables hereinafter, list additions of flocculating reagents in pounds of extract per metric ton of dry clay in suspension. The value of pounds of extract per metric ton of dry clay has been calculated to illustrate the relative amount of undiluted extract, i.e., 100% extract, required in commerical operations to obtain the settling time and rates set forth in these examples.

TABLE 2

| Clay Particle Concentration, Weight Percent | Pounds of Orange Peel Extract Per Metric Ton of Dry Clay | Depth of Supernatant Millimeters | Settling Rate, Milliliters Per Minute |
| --- | --- | --- | --- |
| 3.0 | 0.01 | 15 | 3.0 |
| 7.5 | 0.01 | 17 | 3.4 |
| 15.0 | 0.01 | 20 | 4.0 |
| 25.0 | 0.01 | 24 | 4.8 |
| 30.0 | 0.01 | 28 | 5.6 |
| 3.0 | 0.10 | 18 | 3.6 |
| 7.5 | 0.10 | 21 | 4.2 |
| 15.0 | 0.10 | 23 | 4.6 |
| 25.0 | 0.10 | 28 | 5.6 |
| 30.0 | 0.10 | 34 | 6.8 |
| 3.0 | 0.50 | 24 | 4.8 |
| 7.5 | 0.50 | 28 | 5.6 |
| 15.0 | 0.50 | 35 | 7.0 |
| 25.0 | 0.50 | 42 | 8.4 |
| 30.0 | 0.50 | 42 | 8.4 |
| 3.0 | 1.00 | 25 | 5.0 |
| 7.5 | 1.00 | 29 | 5.8 |
| 15.0 | 1.00 | 35 | 7.0 |
| 25.0 | 1.00 | 44 | 8.8 |
| 30.0 | 1.00 | 43 | 8.6 |

EXAMPLE 5

The process of Example 4 was repeated except that various amounts of a 10% solution by weight of a dispersant was added to the clay-water suspension before the orange peel extract was mixed with the suspension. Table 3 contains the results. Table 3 lists the addition of dispersant solution in pounds of dispersant per metric ton of dry clay in suspension. The value of pounds of dispersant per metric ton of dry clay was calculated and included to illustrate the relative amount of undiluted dispersant, i.e., 100% dispersant, required in a commerical operation.

TABLE 3

| Clay Particle Concentration, Weight Percent | Type of Dispersant | Pounds of Dispersant Per Metric Ton of Dry Clay | Pounds of Orange Peel Extract Per Metric Ton of Dry Clay | Depth of Supernatant, Millimeters | Settling Rate, Millimeters Per Minute |
|---|---|---|---|---|---|
| 3.0 | $Na_2CO_3$ | 1.00 | 0.5 | 22 | 4.4 |
| 7.5 | $Na_2CO_3$ | 1.50 | 0.5 | 27 | 5.4 |
| 15.0 | $Na_2CO_3$ | 2.20 | 0.5 | 29 | 5.8 |
| 25.0 | $Na_2CO_3$ | 2.50 | 0.5 | 32 | 6.4 |
| 30.0 | $Na_2CO_3$ | 3.50 | 0.5 | 33 | 6.6 |
| 3.0 | $Na_2SiO_3$ | 1.00 | 0.5 | 21 | 4.2 |
| 7.5 | $Na_2SiO_3$ | 1.50 | 0.5 | 25 | 5.0 |
| 15.0 | $Na_2SiO_3$ | 2.00 | 0.5 | 28 | 5.6 |
| 25.0 | $Na_2SiO_3$ | 3.00 | 0.5 | 30 | 6.0 |
| 30.0 | $Na_2SiO_3$ | 4.50 | 0.5 | 32 | 6.4 |
| 3.0 | NaOH | 0.50 | 0.5 | 37 | 7.4 |
| 7.5 | NaOH | 1.00 | 0.5 | 39 | 7.8 |
| 15.0 | NaOH | 1.50 | 0.5 | 42 | 8.4 |
| 25.0 | NaOH | 1.75 | 0.5 | 42 | 8.4 |
| 30.0 | NaOH | 2.50 | 0.5 | 44 | 8.8 |

EXAMPLE 6

The process of Example 4 was repeated except that a 0.1% by volume corn husk extract produced according to the process of Example 2 was substituted for the orange peel extract. Table 4 contains the results.

TABLE 4

| Clay Particle Concentration Weight Percent | Pounds of Corn Husk Extract Per Metric Ton of Dry Clay | Depth of Supernatant, Millimeters | Settling Rate, Millimeters Per Minute |
|---|---|---|---|
| 3.0 | 0.01 | 13 | 2.6 |
| 7.5 | 0.01 | 16 | 3.2 |
| 15.0 | 0.01 | 18 | 3.6 |
| 25.0 | 0.01 | 22 | 4.4 |
| 30.0 | 0.01 | 26 | 5.2 |
| 3.0 | 0.10 | 16 | 3.2 |
| 7.5 | 0.10 | 19 | 3.8 |
| 15.0 | 0.10 | 22 | 4.4 |
| 25.0 | 0.10 | 26 | 5.2 |
| 30.0 | 0.10 | 30 | 6.0 |
| 3.0 | 0.50 | 26 | 5.2 |
| 7.5 | 0.50 | 27 | 5.4 |
| 15.0 | 0.50 | 29 | 5.8 |
| 25.0 | 0.50 | 35 | 7.0 |
| 30.0 | 0.50 | 38 | 7.6 |
| 3.0 | 1.00 | 27 | 5.4 |
| 7.5 | 1.00 | 29 | 5.8 |
| 15.0 | 1.00 | 33 | 6.6 |
| 25.0 | 1.00 | 37 | 7.4 |
| 30.0 | 1.00 | 42 | 8.4 |

EXAMPLE 7

The process of Example 5 was repeated except that a 0.1% by volume corn husk extract produced according to the method of Example 2 was substituted for the orange peel extract. Table 5 contains the results.

TABLE 5

| Clay Particle Concentration, Weight Percent | Type of Dispersant | Pounds of Dispersant Per Metric Ton of Dry Clay | Pounds of Corn Husk Extract Per Metric Ton of Dry Clay | Depth of Supernatant, Millimeters | Settling Rate, Millimeters Per Minute |
|---|---|---|---|---|---|
| 3.0 | $Na_2CO_3$ | 1.00 | 0.5 | 24 | 4.8 |
| 7.5 | $Na_2CO_3$ | 1.50 | 0.5 | 25 | 5.0 |
| 15.0 | $Na_2CO_3$ | 2.20 | 0.5 | 26 | 5.2 |
| 25.0 | $Na_2CO_3$ | 2.50 | 0.5 | 32 | 6.4 |
| 30.0 | $Na_2CO_3$ | 3.50 | 0.5 | 40 | 8.0 |
| 3.0 | $Na_2SiO_3$ | 1.00 | 0.5 | 22 | 4.4 |
| 7.5 | $Na_2SiO_3$ | 1.50 | 0.5 | 25 | 5.0 |
| 15.0 | $Na_2SiO_3$ | 2.00 | 0.5 | 27 | 5.4 |
| 25.0 | $Na_2SiO_3$ | 3.00 | 0.5 | 30 | 6.0 |
| 30.0 | $Na_2SiO_3$ | 4.50 | 0.5 | 31 | 6.2 |
| 3.0 | NaOH | 0.50 | 0.5 | 24 | 4.8 |
| 7.5 | NaOH | 1.00 | 0.5 | 28 | 5.6 |
| 15.0 | NaOH | 1.50 | 0.5 | 32 | 6.4 |
| 25.0 | NaOH | 2.00 | 0.5 | 38 | 7.6 |
| 30.0 | NaOH | 2.50 | 0.5 | 45 | 9.0 |

EXAMPLES 8–27

Table 6 lists reactants and results of laboratory bench-scale experiments that further illustrate the variety of possible applications of the two flocculating reagents of the present invention. Various types of mineral slurries were tested using differing amounts of dispersants and flocculating reagents.

In each Example, the experiment was performed by slurrying 89 grams of water with 11 grams of mineral particles, wherein the mineral particles varied in size; 95 percent of the particles were less than 5 microns and 50 percent of the particles were less than 3 microns in size. The slurry was transferred to a conventional 100 milliliter graduated cylinder, mixed with a 10% by weight dispersant, where indicated, thoroughly agitated by capping the cylinder with a rubber stopper and shaking by hand. The agitated slurry was thereafter mixed with a 0.1% by volume orange peel extract produced according to the method of Example 1 or with a 0.1% by volume corn husk extract produced according to the method of Example 2, and thoroughly agitated by capping with a stopper and shaking once again. The contents were than allowed to settle for 12 minutes. During this time, a layer of clear supernatant developed and grew over a lower, more turbid layer. After the 12 minutes expired, the depth of the clear supernatant was determined by measuring the distance between from the surface of the supernatant layer and the line separating the supernatant layer from the turbid layer. In addition the average rate of growth of the supernatant layer was determined over the 12 minute period and is referred to in Table 6 as the "settling rate." Table 6 also lists the addition of flocculating reagent and dispersant in pounds per metric ton of dry material. The value of pounds per metric ton of dry material was calculated to illustrate the relative amount of undiluted extract and dispersant required in commercial operations to obtain the settling times and rates set forth in these examples.

TABLE 6

| Example | Type and Weight Percent of Mineral In Suspension | Type of Dispersant | Pounds of Dispersant per Metric Ton of Dry Mineral | Type of Flocculating Reagent | Pounds of Flocculating Reagent Per Metric Ton of Dry Mineral | Depth of Supernatant, Millimeters | Settling Rate, Millimeters Per Minute |
|---|---|---|---|---|---|---|---|
| 8 | Dolomite, 8.8 wt. % Silica Sand 2.2 wt. % | $Na_4P_2O_7$ | 1.5 | Orange Peel | 0.800 | 140 | 11.67 |
| 9 | Phosphate, 11 wt. % | $Na_4P_2O_7$ | 1.5 | Orange Peel | 0.060 | 52 | 4.33 |
| 10 | Phosphate, 11 wt. % | $Na_2SiO_3$ | 1.2 | Orange Peel | 0.004 | 55 | 4.58 |
| 11 | Barite, 11 wt. % | $Na_2SiO_3$ | 1.2 | Orange Peel | 0.007 | 60 | 5.00 |
| 12 | Limestone, 11 wt. % | $Na_4P_2O_7$ | 1.5 | Orange Peel | 0.250 | 125 | 10.42 |
| 13 | Colloidal Clay, 11 wt. % | $Na_2SiO_3$ | 2.0 | Orange Peel | 0.700 | 108 | 9.00 |
| 14 | Colloidal Clay, 11 wt. % | $Na_4P_2O_7$ | 2.0 | Orange Peel | 0.700 | 72 | 6.00 |
| 15 | Colloidal Clay, 11 wt. % | $(NaPO_3)_x$ | 2.0 | Orange Peel | 0.700 | 55 | 4.58 |
| 16 | Kaolin, 11 wt. % | $Na_2SiO_3$ | 2.5 | Orange Peel | 1.200 | 42 | 3.50 |
| 17 | Kaolin, 11 wt. % | $Na_4P_2O_7$ | 2.5 | Orange Peel | 1.200 | 24 | 2.00 |
| 18 | Kaolin, 11 wt. % | $(NaPO_3)_x$ | 2.5 | Orange Peel | 1.200 | 24 | 2.00 |
| 19 | Colloidal Clay, 8.8 wt. % Bentonite, 2.2 wt. % | $Na_2SiO_3$ | 2.0 | Orange Peel | 0.800 | 22 | 1.830 |
| 20 | Colloidal Clay, 8.8 wt. % Bentonite, 2.2 wt. % | $Na_4P_2O_7$ | 2.0 | Orange Peel | 0.800 | 48 | 4.000 |
| 21 | Talc, 11 wt. % | $Na_2SiO_3$ | 1.2 | Orange Peel | 0.004 | 36 | 3.000 |
| 22 | Dolomite, 11 wt. % | $Na_4P_2O_7$ | 1.5 | Corn Husk | 0.044 | 91 | 7.580 |
| 23 | Phosphate, 11 wt. % | $Na_4P_2O_7$ | 1.5 | Corn Husk | 1.200 | 61 | 5.080 |
| 24 | Limestone, 11 wt. % | $Na_4P_2O_7$ | 1.5 | Corn Husk | 0.150 | 72 | 6.000 |
| 25 | Kaolin, 11 wt. % | $Na_2SiO_3$ | 1.5 | Corn Husk | 1.200 | 91 | 7.580 |
| 26 | Bentonite, 11 wt. % | $Na_4P_2O_7$ | 2.0 | Corn Husk | 0.800 | 34 | 2.830 |
| 27 | talc, 11 wt. % | $Na_2SiO_3$ | 1.2 | Corn Husk | 0.011 | 42 | 3.500 |

EXAMPLES 28–38

The process of Examples 8–27 was repeated except that a mixture of a 0.1% volume orange peel extract produced according to the process of Example 1 and a 0.1% by volume corn husk extract produced according to the process of Example 2 was used as the flocculating reagent without the aid of a dispersant. The slurries tested contained 7.5 weight % colloidal clay and 92.5 weight % water. Also, although the relative amount of orange peel extract and corn husk extract varied for each sample, the total amount of mixture of these extracts mixed with the slurry remained constant. For each example, the equivalent of 1.0 pounds of a mixture of undiluted orange peel and undiluted corn husk extracts were mixed with the slurry.

TABLE 7

| Example | Weight % of Corn Husk Extract | Weight % of Orange Peel Extract | Depth of Supernatant, Millimeters | Settling Rate, Millimeters Per Minute |
|---|---|---|---|---|
| 28 | 100 | 0 | 48 | 4.00 |
| 29 | 90 | 10 | 90 | 7.50 |
| 30 | 80 | 20 | 92 | 7.67 |
| 31 | 70 | 30 | 92 | 7.67 |
| 32 | 60 | 40 | 95 | 7.92 |
| 33 | 50 | 50 | 89 | 7.42 |
| 34 | 40 | 60 | 88 | 7.33 |
| 35 | 30 | 70 | 86 | 7.17 |
| 36 | 20 | 80 | 80 | 6.67 |
| 37 | 10 | 90 | 80 | 6.67 |
| 38 | 0 | 100 | 80 | 6.67 |

EXAMPLE 39

Three hundred and fifty grams of a finely ground hematitic iron ore, 86% of the particles being below 400 mesh (Tyler Standard), were slurried with 2567 milliliters of water producing a composition of slurry that was 11.3% iron ore by weight and 88.7% water by weight. A 10% by weight sodium silicate solution was added to the slurry and the mixture rapidly agitated for ten minutes. The amount of sodium silicate added was equivalent to 0.9 pounds of undiluted sodium silicate per metric ton of iron ore in the slurry. A 0.1% by volume orange peel extract made according to the method of Example 1 was then added to the iron ore slurry in the amount of 0.08 pounds of undiluted extract per metric ton of dry ore in the slurry. The mixture was agitated for one minute at a speed of 1500–2000 revolutions per minute (RPM). After the minute expired, but while agitation continued, a 0.1% by volume corn husk extract made according to the method of Example 2 was added to the slurry in the amount of 0.6 pounds of undiluted extract per metric ton of dry ore in slurry. Agitation continued at 1500–2000 RPM for three minutes and then was reduced to 500 RPM for five more minutes, allowing the flocs to form. After all agitation was completed, the mixture was decanted in an ordinary decanter with the lower more turbid phase being separated from the upper supernatant phase. The supernatant phase contained approximately 2,500 milliliters while the lower more turbid phase contained approximately 250 milliliters.

The upper 2500 milliliter portion of the slurry was designated as the supernatant portion, while the remaining 250 milliliter portion was recovered as the iron-containing underflow product. Both products, the supernatant and the iron-containing underflow product, were weighed and assayed. After addition of the corn husk extract, the pH value of the slurry was 9.0. Table 8 contains the results.

TABLE 8

| Product | Weight Percent | Analysis Iron Percent | Distribution Iron Percent |
|---|---|---|---|
| Iron-Containing Underflow | 87.39 | 33.30 | 97.0 |
| Supernatant | 12.61 | 7.10 | 3.0 |
| Iron Ore Feed | 100.00 | 30.00 | 100.0 |

EXAMPLE 40

The process of example 39 was repeated except that the slurry contained 350 grams of the hematitic iron ore and 3,768 milliliters of water, a slurry which was 8.5% hematitic iron ore by weight. After addition of the corn husk extract, the pH value of the slurry was 8.8. Table 9 contains the results.

TABLE 9

| Product | Weight Percent | Analysis Iron Percent | Distribution Iron Percent |
|---|---|---|---|
| Iron-Containing Underflow | 89.58 | 32.76 | 97.82 |
| Supernatant | 10.42 | 6.27 | 2.18 |
| Iron Ore Feed | 100.00 | 30.00 | 100.00 |

EXAMPLE 41

The process of example 39 was repeated except that sodium silicate was eliminated. After addition of the corn husk extract, the pH value of the slurry was 7.5. Table 10 contains the results.

TABLE 10

| Product | Weight Percent | Analysis Iron Percent | Distribution Iron Percent |
|---|---|---|---|
| Iron-Containing Underflow | 87.32 | 33.70 | 97.25 |
| Supernatant | 12.68 | 6.57 | 2.75 |
| Iron Ore Feed | 100.00 | 30.26 | 100.00 |

The parameters listed above in Examples 1–41 for making and using the extracts of the present invention may be varied. For example, after mixing the orange peels or corn husks with the distilled water, the mixture may be heated to a temperature in the range of about 75° C. to about 95° C. or at any other temperature which will produce the extract of the present invention. The pressure at which heating takes place may also be varied over a wide range to produce satisfactory extracts; a pressure range of about 0.3 to about 0.9 psig, however, is preferred. The mixture of water and orange peels or corn husks may be heated for a variable period ranging from about 15 minutes to several hours. Also, the amount of orange peel or corn husks used relative to the amount of distilled water used may be varied, and the orange peels and corn husks need not be cut into small pieces.

While several particular forms of the invention have been illustrated and described, it will also be apparent that various modifications can be made without departing from the spirit and scope of the invention.

I claim:

1. A flocculating reagent which comprises an extract selected from the group consisting of:
   (a) orange peel extract,
   (b) corn husk extract, and
   (c) a mixture of orange peel extract and corn husk extract.

2. A flocculating reagent which comprises an orange peel extract.

3. A flocculating reagent which comprises a corn husk extract.

4. A flocculating reagent which comprises a mixture of orange peel extract and corn husk extract.

5. A flocculating reagent produced by the process consisting of the steps of:
   (a) mixing orange peels or corn husks with a solvent, and
   (b) heating the said mixture to produce an extract from said orange peel or said corn husks in said solvent.

6. The flocculating reagent of claim 5 wherein said mixture is heated to the boiling point of said mixture.

7. The flocculating reagent of claim 5 wherein said mixture is heated to a temperature of about 75° C. to about 95° C., and at a pressure of about 0.3 pounds per square inch gauge (psig) to about 0.9 psig.

8. The flocculating reagent of claim 7 wherein said mixture is heated for about 20 minutes to about 180 minutes.

9. The flocculating reagent of claim 5 wherein said solvent comprises water.

10. A flocculating reagent produced by the process comprising the steps of:
    (a) admixing about 2 parts of orange peel or corn husks with about 20 parts water by weight,
    (b) heating said mixture to a temperature of about 85° C. at a pressure of about 0.5 pounds per square inch gauge,
    (c) allowing said mixture to simmer at said temperature for about thirty minutes,
    (d) pressing said orange peels or corn husks, and
    (e) separating said orange peels or corn husks from said water.

* * * * *